Jan. 2, 1962 A. A. MEDLOCK Re. 25,107

SHOWER SEAT

Original Filed April 28, 1958 2 Sheets-Sheet 1

Alfred A. Medlock

INVENTOR.

BY Clarence A. O'Brien and Harvey B. Jacobson

Attorneys

SHOWER SEAT

Original Filed April 28, 1958 2 Sheets-Sheet 2

Alfred A. Medlock
INVENTOR.

BY Clarence A. O'Brien and Harvey B. Jacobson
Attorneys

United States Patent Office

Re. 25,107
Reissued Jan. 2, 1962

25,107
SHOWER SEAT

Alfred A. Medlock, East Point, Ga., assignor, by mesne assignments, to Safety Bath International, Inc., Atlanta, Ga.

Original No. 2,888,683, dated June 2, 1959, Ser. No. 731,534, Apr. 28, 1958. Application for reissue May 29, 1961, Ser. No. 121,803
10 Claims. (Cl. 4—147)

Matter enclosed in heavy brackets [ ] appears in the original patent but forms no part of this reissue specification; matter printed in italics indicates the additions made by reissue.

This invention relates to a new, portable shower especially useful in hospitals and old age homes where bathing of invalids in a tub or shower has been found dangerous and/or difficult, but which is capable of a more general application.

The invention entails a portable shower bath which is principally, although not exclusively, designed to facilitate bathing of invalids and persons who have become feeble or incapacitated. The need for such an article is quite prevalent especially in homes for aged where many old members, some of them bedridden, are unable to bathe for long periods because of the danger of suffering an accident on getting in and out of a tub or shower. Their weakened condition makes this dangerous.

The new shower, which rolls on wheels and can be connected to any water supply, may be rolled to the bed side of a patient so that even an injured person can, with care, be placed inside the compartment of the portable shower and enjoy the comfort and accompanying therapeutic value of a shower. The invention will be of invaluable help in hospitals and nursing homes and also to people caring for a sick or invalid member of the family in private homes.

The shower consists generally of a cabinet that has a contour seat in it which is capable of being moved in four directions by means of two hydraulic lifts. The motion is forward, backward, up or down to accommodate the height of the occupant and to facilitate the entrance and exit of the bather. The lifts are operated entirely by water pressure from the ordinary water line thereby necessitating no additional source of power insofar as seat adjustment is concerned.

It is preferred that the shower be equipped with a needle shower system which, besides being used to bathe a patient, can be used for hydro-therapy treatments. By disconnecting the shower from a water outlet the bottom of the compartment can be filled with whatever chemicals are needed for therapy. The invention has a small pump to circulate the mixture through the showering system for several reasons, one of which is to disinfect the entire interior of the shower after it is used.

To care for the problem that exists when the hot water supply is exhausted or there is no such supply available, a small heater is operatively connected in the hydraulic line to preheat the water for the patient, for cleaning the interior of the shower or for any other reason.

Accordingly, an object of the invention is to provide a new and improved portable shower by which to bathe and treat patients or non-patients.

Another object of the invention is to provide a portable shower which is of practical construction and which is easily used, fulfilling a definite need and demand which exists at the present time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which FIGURE 1 is a perspective view of a shower constructed in accordance with the invention.

Figure 1:
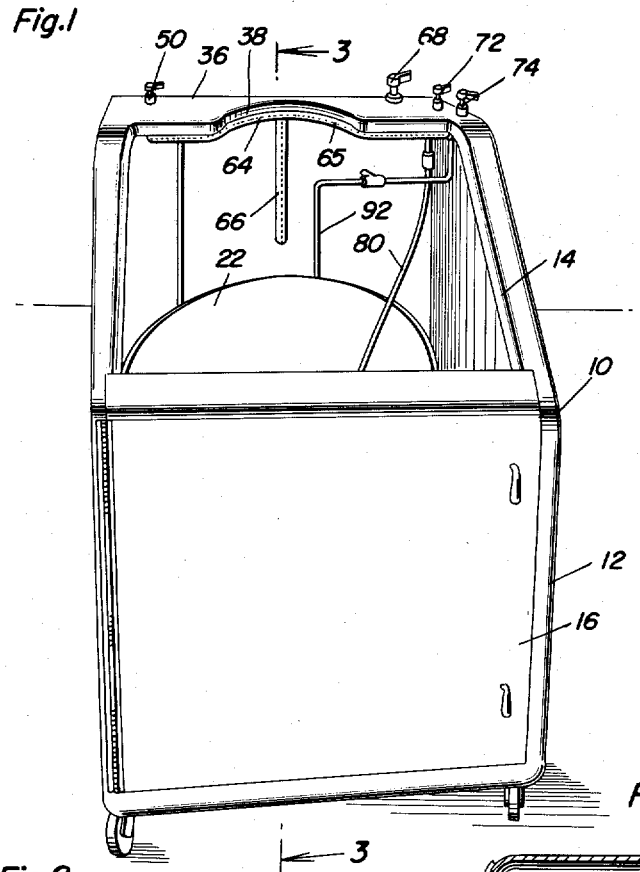
Figure 2:
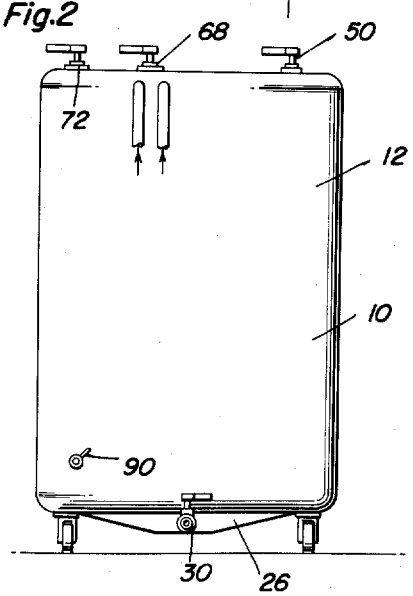
FIGURE 2 is a rear view of the invention.

In the accompanying drawings there is a portable shower 10 that exemplifies the invention. This shower is constructed of a cabinet 12 that has an opening 14 in its front and a door 16 covering only the lower part of the opening. When the door is opened, by releasing latches 18 and swinging about the door supporting hinges 20, the entire front of the cabinet is open to facilitate the entry or exit of a patient who would be seated on contour seat 22. The upper parts of the front edges of the cabinet are sloped rearwardly so that the patient or occupant's head and arms are free of the cabinet although the patient may at his own choice and discretion put his arms into the cabinet.

Figure 3:
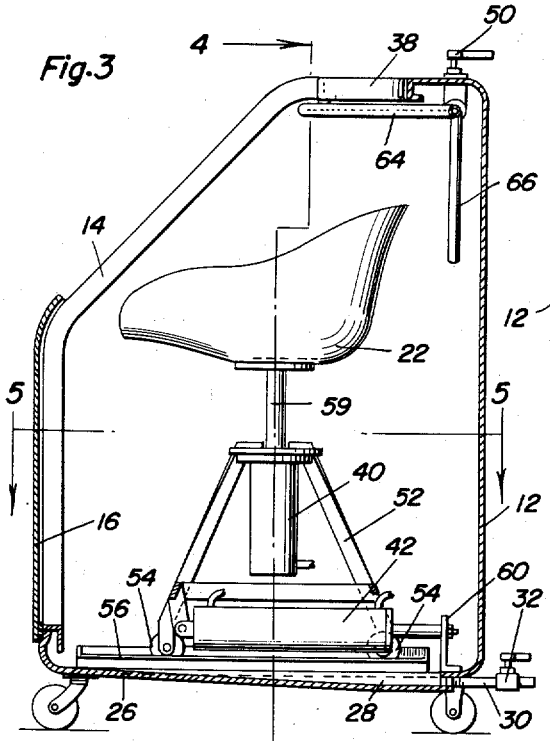
FIGURE 3 is a sectional view taken on the line 3—3 of FIGURE 1.
Figure 4:
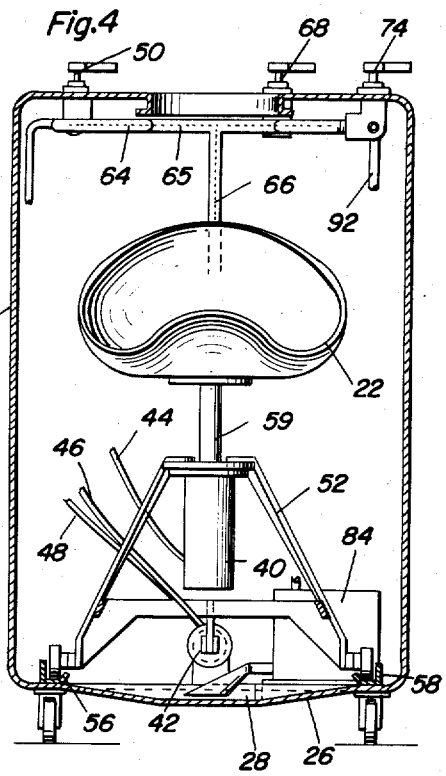
FIGURE 4 is a sectional view taken on the line 4—4 of FIGURE 3.

As shown in FIGURE 3 the cabinet has a bottom 26 which slopes gently to form a sump 28. This is to facilitate drainage through drain line 30 controlled by manual valve 32. Both the sump 28 and valve 32 are optional features. The top wall 36 of the cabinet has a contoured recess 38 for the neck of the occupant and supports a group of control handles that are on conventional valves. No special valves were needed nor used in the shower, each valve being commercially available and in rather widespread use in many fields.

Figure 6:
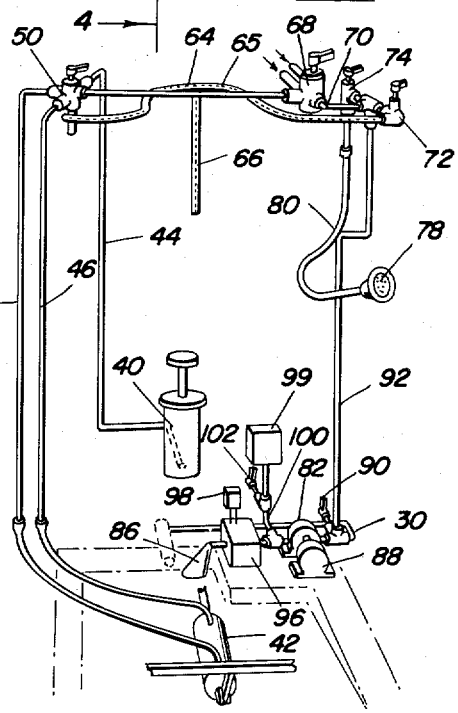
FIGURE 6 is a largely schematic perspective view showing the hydraulic flow system of the shower.

Reference is now made to FIGURE 6 where the hydraulic flow pattern is illustrated. Two hydraulic lifts 40 and 42 each consisting of a hydraulic cylinder, are connected to lines 44, 46 and 48. The line 44 extends from one port of the seat valve 50. This is a four-way valve having an off position, a position sending water through line 44 and to lift 40, and another position sending water through line 46 into lift 42 and a final position which would send water through line 48 to cylinder or lift 42. The lift 42 is a double acting cylinder whereas lift 40 is a single acting cylinder.

Cylinder 40 is attached to a seat support framework or frame 52 that has four wheels 54 at its lower end. These wheels are disposed in a track composed of rails 56 and 58 that are secured to the bottom 26 of the cabinet. The piston rod 59 of the cylinder 40 rises upwardly through the top of the frame 52 and is attached to the bottom part of the contour seat 22. Therefore, when the seat 42 is to be raised or lowered, valve 50 is properly adjusted to deliver water into the cylinder 40 or to permit water to return from the cylinder 40.

Double acting cylinder 42 is attached to a part of the seat frame 52 and attached to a bracket 60 that is carried by the cabinet. If desired, bracket 60 can be omitted with a direct connection made between the cylinder 42 and the cabinet. The cylinder is approximately parallel to the rails 56 and 58 of the track and when extended and retracted, moves the frame and frame supported seat 22 fore and aft of the cabinet.

The spray portion of the system is composed of a needle spray. This has a first conduit 64 closed at its outer end and connected in the water supply line at its inner end. A curved recess 65 is in the conduit and located below recess 38. This is approximately in the region of the neck of the occupant while the ends of the spray are at approximately shoulder level. Spray conduit 66 drops approximately vertically from the center of the recess 65 and is partially along the spine of the occupant of the seat 22. To form the needle spray the conduits have a plurality of small orifices therein.

Mixing valve 68 which is adapted to connect to supplies of hot and cold water respectively, has a pipe 70 extending therefrom through which the water is discharged. This pipe has ordinary fittings and a shower control valve 72 upstream of the spray head or spray. Another valve 74 is connected to pipe 70 and is arranged in parallel with valve 72. Spray head 78 at the end of flexible hose 80, is fed from valve 74 by having the flexible hose 80 operatively connected with and controlled by valve 74. The purpose of the spray head is for showering of the occupant and/or the interior of the cabinet.

Figure 5:
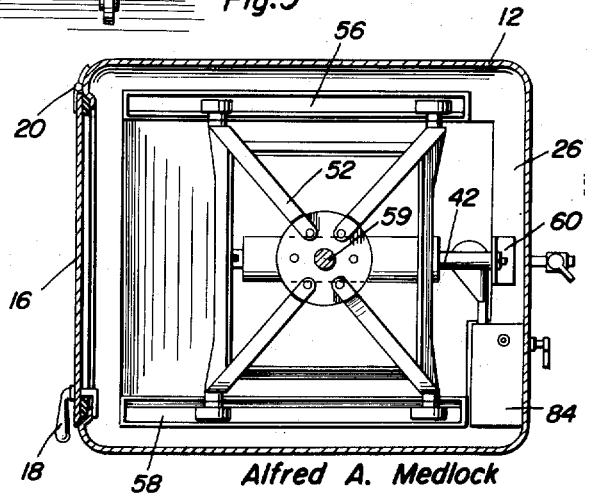
FIGURE 5 is a sectional view taken on the line 5—5 of FIGURE 3.

As indicated previously the cabinet can be drained through drain line 30. This can be a gravity flow drain. As an alternative or an option, a small pump 82 is mounted in a protective housing 84 (FIGURE 5) and has a water inlet 86 whose intake end is in sump 28. Motor 88 drives the pump and has standard motor controls on the exterior of the cabinet. Selector valve 90 is in the drain line 30 and has three positions. One position is the off position, another opens the drain line 30 and the third is to send water under pump pressure through line 92 which is connected between valves 72 and 74 and to pipe 70. Therefore the water in the bottom of the cabinet can be recirculated for any reason.

Heater 96 is in the line 80 and has a thermostat 98 to control the heating of the water as it is taken from the bottom of the cabinet. A container 99 is connected by a pipe 100 to line 86 downstream of the heater. Container 99 can contain disinfectant, soap, detergent or any other substance to be added to the water. Therefore, a valve 102 is in the line 100 to control not only the admission of substance from container 99, but the rate of flow from the container into the line 86.

In use, the occupant enters the cabinet and becomes seated on the contour chair or seat 22. After selecting the correct height of the seat and the correct fore and aft positions of the seat, the occupant is ready for bathing. hydro-therapy or any other treatment.

Of course, correct judgment for water temperatures are exercised by preselecting the correct temperature of water by the use of mixing valve 68. After hydro-therapy, showering, etc., the occupant is easily removed from the cabinet and the cabinet can be cleaned by relying wholly on the recirculation water or by relying on additional inlet water. By using the recirculation water, detergent, disinfectant, etc. can be introduced into the cabinet through the spray system for sanitation and cleanliness.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A shower seat comprising the combination of a cabinet having a bottom, and side walls, a seat, a frame in said cabinet, a track on which said frame is supported for movement, means connected to said frame for adjusting said frame in said track, means mounting said seat on said frame for vertical adjustment, said seat adjustment means and said means for moving said frame each hydraulically actuated, a hydraulic flow system for delivering liquid under pressure to said frame moving means and said seat lifting means and including a selector valve, a mixing valve, a water conductor extending from said mixing valve to said selector valve, said mixing valve having hot and cold water inlet ports, and means including a shower spray extending from said mixing valve with said shower spray disposed in said cabinet to spray the occupant of said seat.

2. A shower seat comprising the combination of a cabinet having a bottom, and side walls, a seat, a frame in said cabinet, a track on which said frame is supported for movement, means connected to said frame for adjusting said frame in said track, means mounting said seat on said frame for vertical adjustment, said seat adjustment means and said means for moving said frame each hydraulically actuated, a hydraulic flow system for delivering liquid under pressure to said frame moving means and said seat lifting means and including a selector valve, a mixing valve, a water conductor extending from said mixing valve to said selector valve, said mixing valve having hot and cold water inlet ports, and means including a shower spray extending from said mixing valve with said shower spray disposed in said cabinet to spray the occupant of said seat, said means including a shower spray also having a valve to control the passage of liquid through said shower spray and a pipe within which said valve is located, a recirculation pump in said cabinet, a liquid conducting line extending from said pump to said pipe to recirculate water from said cabinet to said shower spray.

3. A shower seat comprising the combination of a cabinet having a bottom, and side walls, a seat, a frame in said cabinet, a track on which said frame is supported for movement, means connected to said frame for adjusting said frame in said track, means mounting said seat on said frame for vertical adjustment, said seat adjustment means and said means for moving said frame each hydraulically actuated, a hydraulic flow system for delivering liquid under pressure to said frame moving means and said seat lifting means and including a selector valve, a mixing valve, a water conductor extending from said mixing valve to said selector valve, said mixing valve having hot and cold water inlet ports, and means including a shower spray extending from said mixing valve with said shower spray disposed in said cabinet to spray the occupant of the seat, said means including a shower spray also having a valve to control the passage of liquid through said shower spray and a pipe within which said valve is located, a recirculation pump in said cabinet, a liquid conducting line extending from said pump to said pipe to recirculate water from said cabinet to said shower spray, a container adapted to hold disinfectant detergent and the like, whereby disinfectant, detergent and the like may be introduced into said line that extends from said pump to said pipe.

4. A shower seat comprising the combination of a cabinet having a bottom, and side walls, a seat, a frame in said cabinet, a track on which said frame is supported for movement, means connected to said frame for adjusting said frame in said track, means mounting said seat on said frame for vertical adjustment, said seat adjustment means and said means for moving said frame each hydraulically actuated, a hydraulic flow system for delivering liquid under pressure to said frame moving means and said seat lifting means and including a selector valve, a mixing valve, a water conductor extending from said mixing valve to said selector valve, said mixing valve having hot and cold water inlet ports, and means including a shower spray extending from said mixing valve with said shower spray disposed in said cabinet to spray the occupant of said seat, said means including a shower spray also having a valve to control the passage of liquid through said shower spray and a pipe within which said valve is located, a recirculation pump in said cabinet, a liquid conducting line extending from said pump to said pipe to recirculate water from said cabinet to said shower spray, a water heater having a line extending from within said cabinet adjacent to the bottom thereof to said pump so that water may be heated prior to recirculation in the cabinet.

5. The shower of claim 4 wherein there are means including a thermostat for controlling the temperature of the water that is heated in said heater, and a container adapted to hold disinfectant, detergent and the like and operatively connected in the line that connects with said pump to introduce a quantity of detergent, disinfectant and the like into said pipe for recirculation.

6. The shower of claim 5 wherein said track includes a pair of rails, said framework having wheels mounted on said rails and constrained in their movement by said rails, and said cabinet having cabinet supporting wheels so that said cabinet is easily moved from one place to another.

7. A portable shower comprising a cabinet that has side walls, a bottom, a seat in said cabinet, a shower spray in said cabinet, means including a mixing valve and a pipe for introducing water under pressure into said shower spray, a recirculating pump having a liquid inlet at said bottom of said cabinet, a liquid conducting line extending from said pump to said pipe to recirculate liquid in said shower spray, a seat frame in said cabinet, means for adjusting said seat frame in one direction, and adjustable means for adjusting said seat with respect to said frame and in a direction transverse to the first mentioned direction.

8. A portable shower comprising a cabinet that has side walls, a bottom, a seat in said cabinet, a shower spray in said cabinet, means including a mixing valve and a pipe for introducing water under pressure into said shower spray, a recirculating pump having a liquid inlet at said bottom of said cabinet, a liquid conducting line extending from said pump to said pipe to recirculate liquid in said shower spray, an additional shower spray adapted to be used selectively simultaneously with the first mentioned shower spray and independently of said shower spray, control valves upstream of each of said shower sprays and connected with said pipe, a seat frame in said cabinet, means for adjusting said seat frame in one direction, and adjustable means connecting said seat to said seat frame for adjusting movement in a direction transverse to the first mentioned direction.

*9. A portable shower comprising a cabinet, a seat, seat support means supporting said seat in said cabinet, a first hydraulic cylinder connected to said seat support means for positioning said seat in a first direction, and a second hydraulic cylinder connected to said seat support means for adjusting said seat in a second direction substantially transverse to said first direction, a shower spray disposed in said cabinet for transmitting water to the vicinity of said seat, valving means for introducing water under pressure selectively into said hydraulic cylinders, or to said shower spray.*

*10. A shower comprising a cabinet, supporting wheels on said cabinet for easy movement from one place to another, a seat, seat support means supporting said seat in said cabinet, a shower spray disposed in said cabinet for transmitting water to the vicinity of said seat, a first horizontally disposed hydraulic cylinder connected to said seat support means for positioning said seat in a horizontal direction, and a second vertically disposed hydraulic cylinder connected to said seat support means for adjusting said seat in a vertical direction, valving means for introducing water under pressure selectively into said hydraulic cylinders, or to said shower spray.*

References Cited in the file of this patent or the original patent

UNITED STATES PATENTS

| | | |
|---|---|---|
| 2,540,159 | Antrim | Feb. 6, 1951 |
| 2,582,586 | Dorr | Jan. 15, 1952 |
| 2,641,770 | Chapin | June 16, 1953 |
| 2,648,849 | Webb et al. | Aug. 18, 1953 |
| 2,714,725 | Boone | Aug. 9, 1955 |
| 2,772,721 | Saunders | Dec. 4, 1956 |